Patented Apr. 14, 1925.

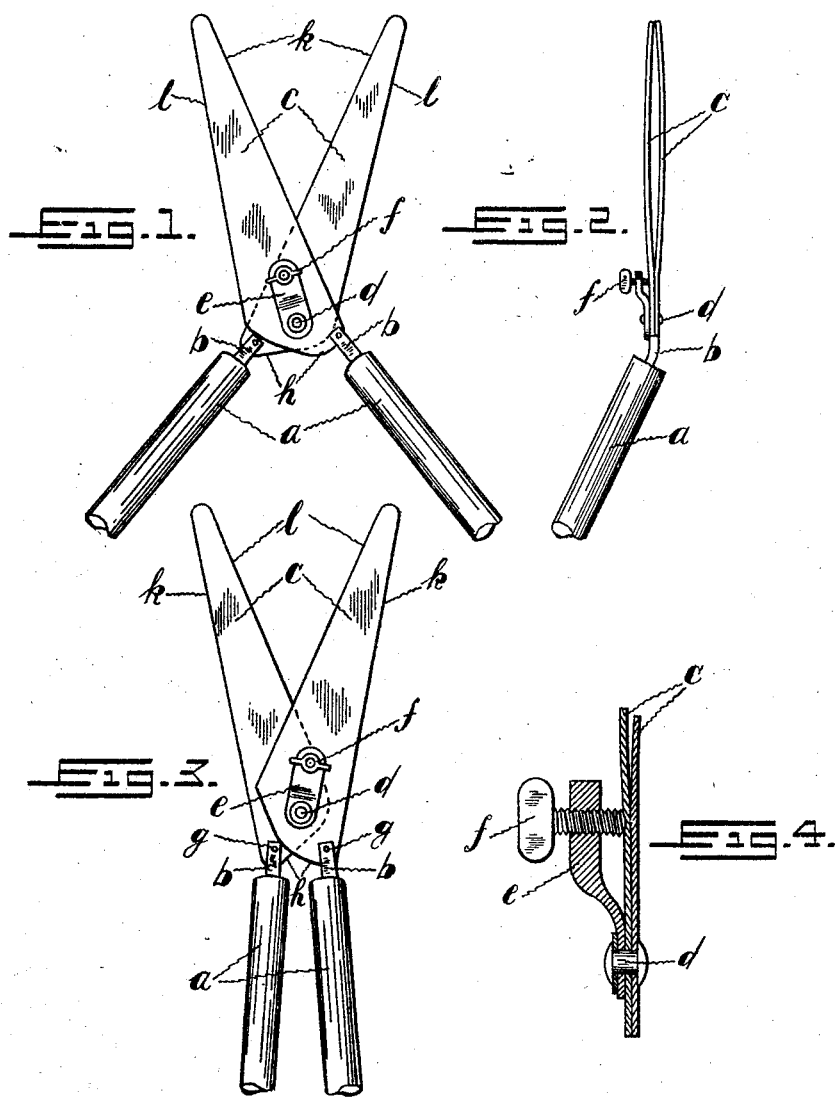

1,533,479

UNITED STATES PATENT OFFICE.

JAMES THOMAS STITT, OF NEMEGOS, ONTARIO, CANADA.

SHEARS FOR CUTTING AND TRIMMING GRASS AND HEDGES.

Application filed November 17, 1924. Serial No. 750,335.

*To all whom it may concern:*

Be it known that I, JAMES THOMAS STITT, of Nemegos, in the district of Sudbury, in the Province of Ontario, Canada, a subject of the King of Great Britain, have invented certain new and useful Improvements in Shears for Cutting and Trimming Grass and Hedges, of which the following is a specification.

My invention relates to improvements in shears for cutting and trimming grass and hedges, in which two knives are fastened together by a rivet, and operated by handles attached to the said knives; and the object of my improvement is to provide a double cutting action for such shears, whereby the knives will cut not only when the handles are drawn together, but will also cut when the handles are drawn apart.

I attain these objects by the mechanism illustrated in the accompanying drawing, in which Fig. 1 is a plan view of the shears, the handles positioned at the end of their outward stroke;

Fig. 2 a side elevation of the shears;

Fig. 3 a plan view of the shears with the handles positioned at the end of their inward stroke; and Fig. 4 a sectional detail of the mechanism which adjusts the bearing of the knives.

Similar letters refer to similar parts throughout the several views.

The handles $a\ a$, blades $c\ c$, rivet $d$, spring $e$, set screw $f$, bars $b\ b$, and rivets $g\ g$, constitute the shears. The handles $a\ a$, are fitted on the bars $b\ b$, and the latter are secured by rivets $g\ g$, to the blades $c\ c$. The blades $c\ c$, are sharpened on all edges except the rounded edge $h\ h$, at the base of the blades. When the handles $a\ a$, as in Figure 1 are drawn together the blades $c\ c$, are drawn together and the cutting edges $k\ k$, of the blades $c\ c$, are brought into operation, the inward movement of the handles $a\ a$, finishing as shown in Figure 3. When the handles $a\ a$, as in Figure 3 are drawn apart the blades $c\ c$, are drawn together and the cutting edges $l\ l$, are brought into operation, the outward stroke of the handles finishing as in Figure 1. The spring $e$, and set screw $f$, serve to regulate and maintain the bearing of the blades $c\ c$ as tight as may be necessary.

I am aware that pruning shears have been proposed which cut both when the handles are moved together and when they are spread apart, but such shears have not been made with two double edged blades adapted to pass one another so that the right hand edge of one blade may be brought into co-operative relationship with the left hand edge of the other and vice versa. Nor have such double edged blades been symmetrically disposed relative to the handles, both of which arrangements are essential in double cutting grass shears since the line of cutting must always have a fixed direction relative to the operator, and for the greatest convenience in operation the line of cutting, when rearwardly projected, should bisect the angle between the handles.

Nor have shears been proposed in which the handles are so positioned relative to the blades that each handle is movable between two extreme positions at its own side of the line of cut whereby cutting with one set of edges takes place as the handles are spread apart and with the other edges as they are brought together.

What I claim is:—

1. In grass cutting shears, a pair of double-edged blades pivotally connected at a point in a line intermediate of their cutting edges, the blades being adapted to pass one another so that the right hand edge of one blade may be brought into co-operative relationship with the left hand edge of the other or vice versa, the handles being positioned relative to the blades so that each handle is movable between two extreme positions at its own side of the line of cut, whereby cutting with one set of edges takes place as the handles are spread apart and with the other set of edges as they are brought together.

2. In grass cutting shears, a pair of handles; a pair of double-edged blades pivotally connected at a point in a line intermediate of their cutting edges and symmetrically disposed relative to the handles, the blades being adapted to pass one another so that the right hand edge of one blade may be brought into co-operative relationship with the left hand edge of the other or vice versa, the handles being positioned relative to the blades so that each handle is movable between two extreme positions at its own side of the line of cut, whereby cutting with one set of edges takes place as the handles are spread apart and with the other set of edges as they are brought together.

Signed at Chapleau, this 1st day of October, 1924.

JAMES THOMAS STITT.